May 14, 1940.　　　V. W. WHITMER　　　2,201,067
METHOD OF MAKING METAL ARTICLES WITH HANDLES
Filed Feb. 9, 1939

INVENTOR.
VIRGIL W. WHITMER
BY
Richey & Watts
ATTORNEYS

Patented May 14, 1940

2,201,067

UNITED STATES PATENT OFFICE 2,201,067

METHOD OF MAKING METAL ARTICLES WITH HANDLES

Virgil W. Whitmer, Canton, Ohio, assignor to Republic Steel Corporation, Cleveland, Ohio, a corporation of New Jersey Application February 9, 1939, Serial No. 255,471

5 Claims. (Cl. 219—10)

This invention relates to articles composed of united metallic and non-metallic parts, and is more particularly concerned with new and improved handles for hollow ware, such as coffee pots and analogous utensils, and a new and improved method of attaching such handles to such articles.

It is desirable to provide hollow metal articles, such as coffee pots, tea pots and the like, with non-metallic handles which will not become highly heated by the contents of the article. Heretofore, such handles have been attached to such articles by various expedients, such as bolts, screws and the like which often loosen in use and become unsatisfactory for that reason.

It is the purpose of the present invention to provide a non-metallic handle which can be attached by a weld joint to one side of a metallic article and to provide a simple process for welding such an article and handle to each other. By this invention, I am able to provide a "cool" handle and to attach it permanently to thin metal articles, particularly hollow ware articles.

In the drawing accompanying and forming a part of this specification,

Figure 1:
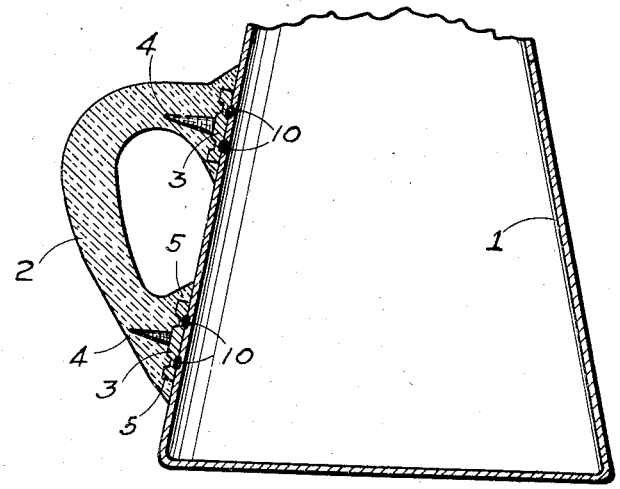
Figure 1 is a fragmentary, cross sectional view thru a hollow article embodying one form of the present invention.

In the drawing, part of a coffee pot 1 has attached to it a handle which comprises a non-metallic, preferably plastic, body 2 and metal members or ends 3, each provided with a suitable anchor, such as a screw-threaded projection 4, which serves to attach the metal end in the body 2 of the handle. Preferably the metal ends 3 are molded into recesses in the body portion 2 and their side edges are covered by the material of the body, as is indicated at 5, so that when the handle is attached to the hollow ware article, the non-metallic material will lie close to the article 1 and the metal ends will be concealed thereby. As is better shown in Fig. 2, each metal end 3 is provided with two or more projections 6 extending a short distance beyond the adjacent surface of end 3, so as to engage the surface of the article 1 preliminary to the welding operation.

Figure 2:
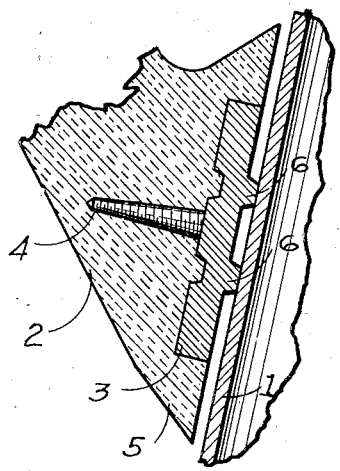
Figures 2 and 3 are enlarged, fragmentary, detail, sectional views taken thru one of the metal plugs in one end of the handle of the utensil before and after the welding operation has been performed.
Figure 3:
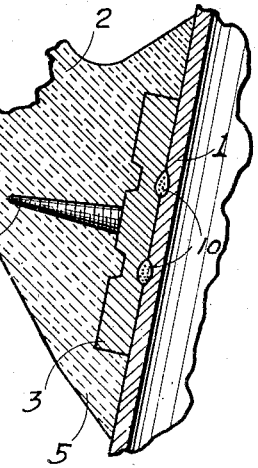

In Figs. 2 and 3 are illustrated, respectively, the relative positions of one end 3 and part of article 1 before the welding operation takes place, and after the welding has been completed. It will be noted that in Figure 2 only the projections 6 of member 3 contact with the metal of article 1, while in Fig. 3 the adjacent surfaces of end 3 and article 2 have been brought close to, or actually against, each other and welded joints have been formed where the projections initially engaged article 1.

Since the welding electrodes and ends 3 are located on opposite sides of the wall of article 1, it is important that provision be made to insure a flow of welding current between that wall and each end 3. Such a flow of current may be insured by providing a path of least electrical resistance from one electrode thru the wall of article 1, thence thru end 3 and then thru the said wall to the other electrode. Such a path is provided by the present invention by making the wall of article 1 thinner than ends 3 or of higher electrical resistance metal, or both; and also by spacing projection 6 on each end 3 far enough apart from each other so that the welding current will meet with less resistance in flowing thru end 3 between projections 6 than it would encounter if it flowed thru the wall of article 1 between those projections. For example, when article 1 is composed of stainless steel and is about .025 inch thick, the ends 3 of the handle can be made of soft iron or low carbon steel about .078 inch thick and should have two projections 6 spaced ⅜" or more apart from each other. Projections 6 may be .010 inch long or longer, if desired.

Figure 4:
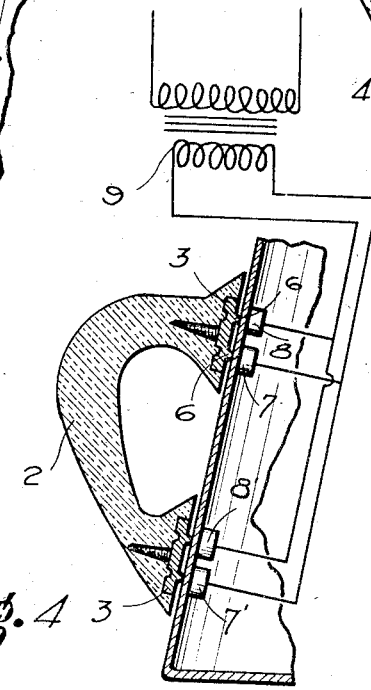
Figure 4 is a diagrammatic, fragmentary view showing the manner of carrying out the present process of welding the metal ends of the handle to the thin metal of the utensil of Figure 1.

Figure 4 shows, partly diagrammatically, the manner of practicing the present process. In this figure, welding electrodes 7 and 8 are pressed against the inner surface of article 1 and one end 3 of handle 2 is pressed against the outer surface of the article with welding pressure and with one projection 6 being located directly oposite to electrode 7 and the other projection being opposite to electrode 8. The path of the welding current is from transformer 9 to one electrode, thru the wall of article 1 to one projection 6, thru end 3 to the other projection, then thru the wall to the other electrode and back to the transformer. The projections, and portions of the wall of article 1 which they engage, become heated to welding temperature and welds 10, as indicated in Figures 1 and 3, are formed which unite the end 3 to article 1 more or less permanently, the projection 6 being substantially eliminated and the portion 5 of handle 2 taking position close to the side of article 1.

Figure 4 also indicates the manner in which both ends 3 of handle 2 may be simultaneously welded to article 1. Two sets of similar electrodes 7 and 8 and 7' and 8' are provided, one set for each end 3, and both sets are pressed against the inner surface of article 1 while both ends 3 are pressed against the outer surface, and welding current is supplied to both sets of electrodes. The welding operation in this case is substantially the same as that described above in connection with one set of electrodes.

While the present invention has been described hereinabove in some detail in connection with hollow ware and double-ended handles, it will be understood that such description has been made merely for the purpose of illustration. It will be obvious to those skilled in the art that the present invention is not limited to such articles or to such handles but that it is applicable to a wide variety of articles and attached parts.

It will be understood that the present invention makes it possible to weld a metal part to one side of a thin metal article by the use of electrodes disposed on the other side thereof and that non-metallic articles may be permanently attached to metal articles by welding and in a manner which produces an article which has a pleasing appearance and is devoid of screws, bolts and other fastening devices which may loosen during use.

Having thus described the present invention so that others skilled in the art may be able to understand and practice the same, I state that what I desire to secure by Letters Patent is defined in what is claimed.

What is claimed is:

1. The method of attaching a non-metallic handle to a thin metal article which comprises the steps of attaching to the end of such a handle a metal member having projections, pressing such projections with welding pressure against one surface of such an article, and passing welding current thru said article and said projections in series to form a weld between said member and said article.

2. The method of attaching a non-metallic handle to a thin metal article which comprises the steps of attaching to each of the ends of such a handle a thick metal member having two spaced projections on one of said members, pressing said projections against one surface of such an article, pressing welding electrodes against the other surface of such article and opposite to said projections, and passing welding current from one electrode thru said article to one projection then thru said member to the other projection and back thru the article to the other electrode thereby forming a weld between said member and said article, and repeating such pressing and welding procedure with respect to said second member.

3. The method of fastening an element of non-conducting material to a second element of electrical conducting material which consists of imbedding a current conducting member in said first-mentioned element in such manner that two spaced welding projections are provided, placing said projections in pressure contact with said second element, and passing a welding current through said second element, welding projections and current conducting member in series to effect welds between said projections and said second element.

4. The method of fastening an element of non-conducting material to a second element of electrical conducting material which consists of imbedding a current conducting member in said first-mentioned element in such manner that two spaced exposed surfaces thereof are provided, placing said surfaces in pressure contact with said second element, and passing a welding current through said second element, exposed surfaces and current conducting member in series to effect welds between said surfaces and said second element.

5. The method of attaching a non-metallic handle to a thin metal article which comprises the steps of attaching to each of the ends of such a handle a thick metal member having two spaced projections, pressing the projections of each of said members against one surface of such an article, simultaneously pressing against the other surface of said article pairs of electrodes, the electrodes of each pair of electrodes, being disposed opposite respectively to the projections of each of said members, and simultaneous passing welding current from one electrode of each pair of electrodes through said article to the opposed projection, then through the member to the other projection and back through the article to the other electrode, thereby forming welds between said members and said article.

VIRGIL W. WHITMER.